April 29, 1969   L. E. NICKLA ET AL   3,441,152
BALE TRANSFER MECHANISM
Filed April 28, 1967   Sheet 2 of 3
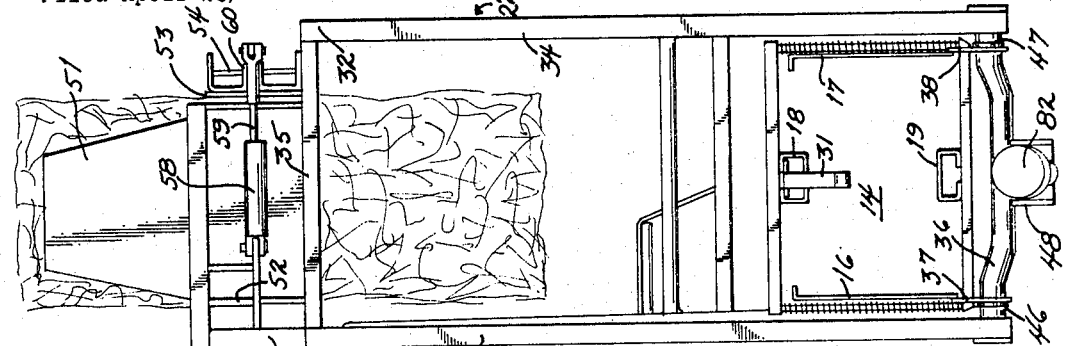
FIG-4-
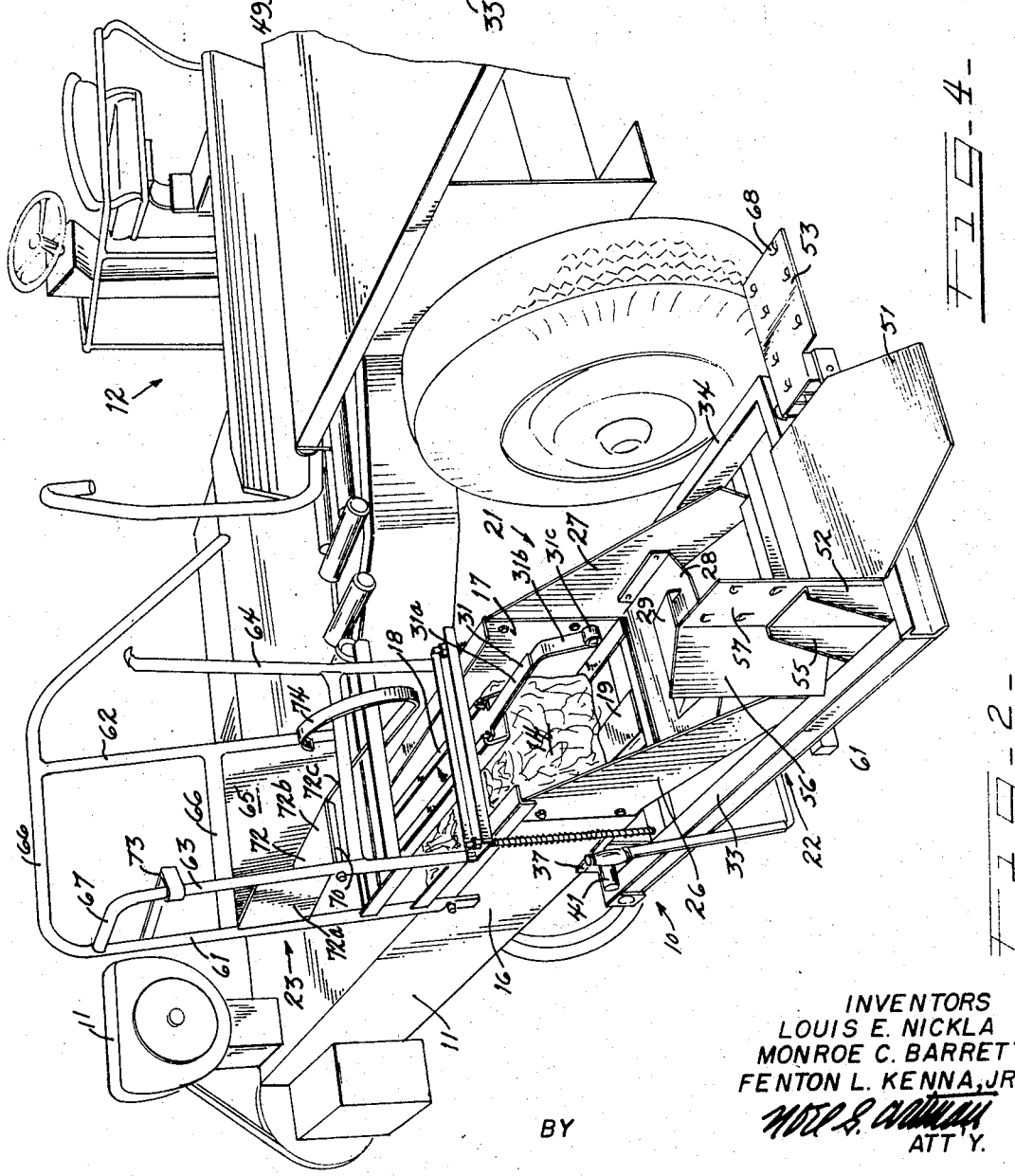
FIG-2-
INVENTORS
LOUIS E. NICKLA
MONROE C. BARRETT
FENTON L. KENNA, JR.
BY
ATT'Y.

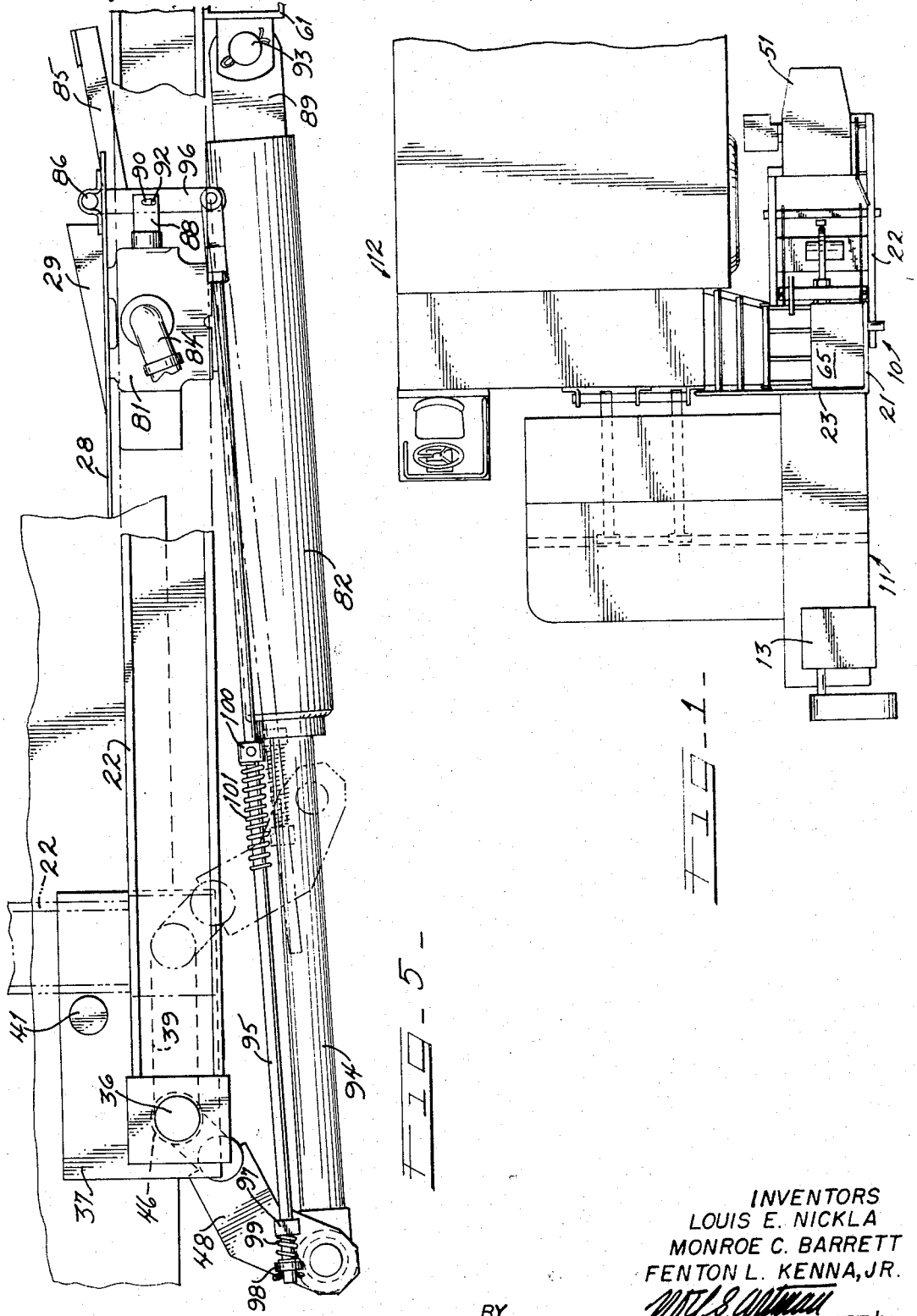

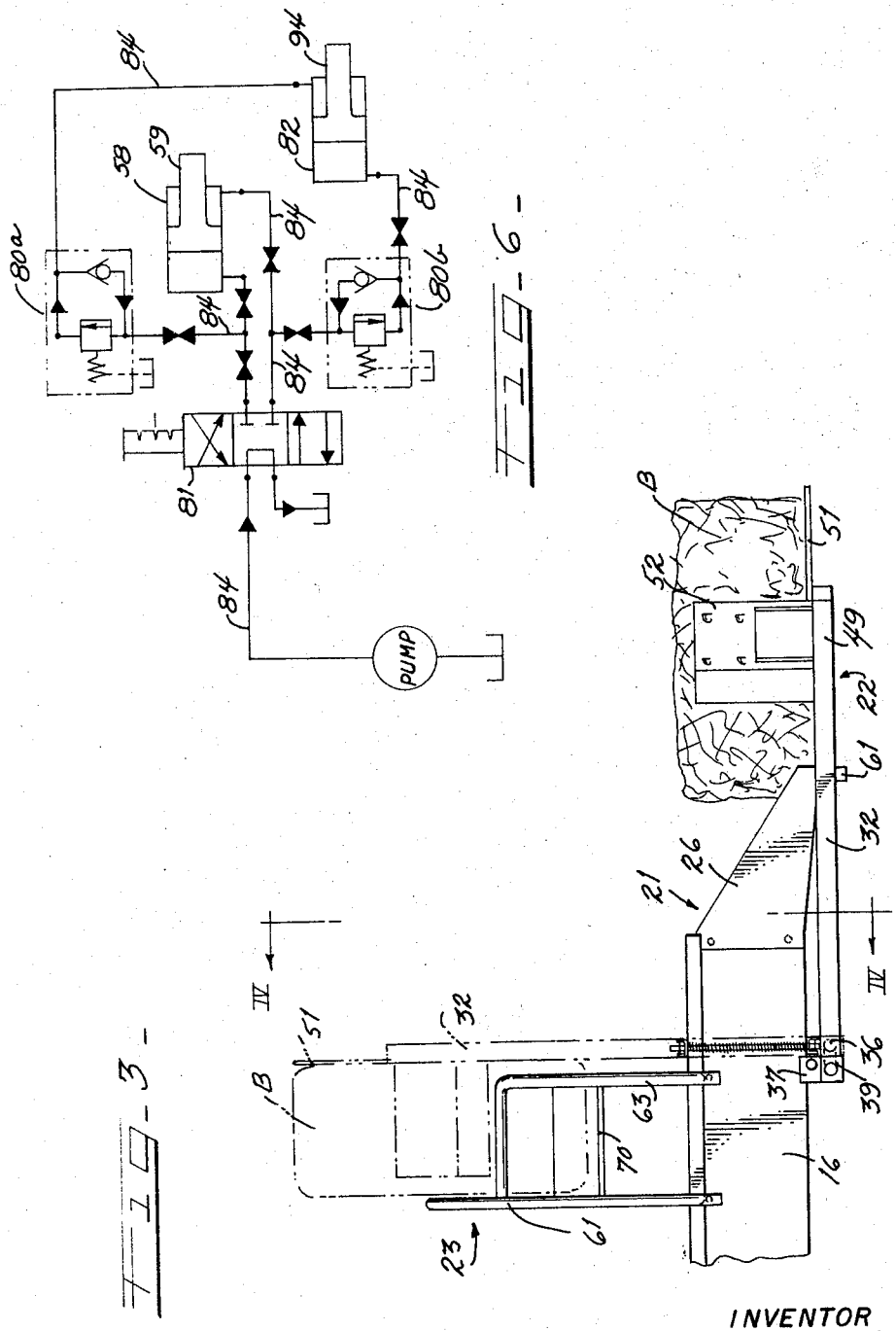

United States Patent Office 3,441,152
Patented Apr. 29, 1969

3,441,152
BALE TRANSFER MECHANISM
Louis E. Nickla, Monroe C. Barrett, and Fenton L. Kenna, Jr., Memphis, Tenn., assignors to International Harvester Company, Chicago, Ill., a corporation of Delaware
Filed Apr. 28, 1967, Ser. No. 634,598
Int. Cl. B65g 67/22
U.S. Cl. 214—42                    13 Claims

ABSTRACT OF THE DISCLOSURE

A bale transfer mechanism for transferring bales of hay from a baler to an associated bale wagon and having a hydraulic actuated bale carrier for receiving, upending, and elevating bales of hay, and deflector means for directing the upended bales onto the associated bale wagon.

Background and summary of the invention

This invention relates to agricultural implements and more particularly to an attachment for a conventional baler for automatically transferring bales therefrom to an associated bale wagon.

The continuing search for labor saving implements has recently produced the automatic bale wagon. The bale wagon provides mechanical means for automatically picking up, stacking, and unloading bales in a predetermined pattern. Automatic bale wagons of diverse description are presently known; typical bale wagons are described in Patents 2,848,127 and 3,159,287 issued to G. E. Grey and H. R. Stroup, respectively.

Automatic bale wagons are provided with transfer mechanisms to transfer the bales either from the ground to the wagon or from the baler to the wagon. The transfer mechanism generally is an integral part of the overall bale wagon structure but, as hereinafter disclosed, may be attached to the baler and detached from the bale wagon.

The Grey bale wagon is designed to operate independently of the baler and is provided with an elevator for picking up bales resting on the ground and depositing them on the receiving platform. If the Grey bale wagon with the elevator as the transfer means were connected to the baler, the elevator would have to be located at least one bale length behind the baler discharge. This combination would result in a rather long train and make maneuverability extremely cumbersome. The Stroup patent discloses a baler-bale wagon combination (FIG. 1). The bale wagon is provided with a transfer mechanism adapted to move the bales laterally away from the bale chamber discharge, and then longitudinally onto the storage bed. Here, too, the wagon is located to the rear of the baler, resulting in a cumbersome unit.

Summary of the invention

The present invention contemplates the use of a novel transfer mechanism to be mounted on a conventional baler and operable to permit the use of automatic bale wagons therewith. The transfer mechanism operates in three steps: (1) receives a bale and moves the bale rectilinearly away from the bale discharge, (2) pivotally elevates the bale to the level of the bale wagon and (3) deposits the bale crosswise onto the wagon.

An object of the present invention is to provide a transfer mechanism to receive a bale in one disposition and deposit the bale onto an associated bale wagon in another disposition.

Another object is to provide a transfer means whereby a conventional baler and bale wagon can be operated as a compact unit.

A further object is to provide a transfer mechanism to elevate a bale discharged from a baler onto an associated bale wagon.

These and other objects of the invention will become apparent to those skilled in the art as the disclosure is made in the following detailed description of a preferred embodiment of the invention as illustrated in the accompanying sheets of drawings.

Drawings

FIGURE 1 is a plan view showing the baler-bale wagon combination and the transfer mechanism associated therewith;

FIGURE 2 is a perspective view of a transfer mechanism shown in the horizontal home position;

FIGURE 3 is a fragmentary side view showing the principal parts of the transfer mechanism;

FIGURE 4 is a sectional view taken generally along line IV—IV of FIGURE 3, and showing the bale carrier in a vertical position;

FIGURE 5 is a fragmentary side view of the transfer mechanism with parts cut away for convenience of illustration, and FIGURE 6 is a schematic view showing the hydraulic system used to operate the transfer mechanism.

Description

For purposes of illustration, a novel transfer mechanism 10 contructed in accordance with the principles of the present invention is shown operating in conjunction with a conventional baler 11 and a self-propelled automatic bale wagon 12 of the type described in U.S. Patent No. 2,848,127. The adaptation of the baler 11 to the bale wagon 12 is discussed in copending application Ser. No. 634,599.

As shown in FIGURE 1 the bale wagon 12 is connected to the baler 11 and positioned alongside the bale transfer mechanism 10. This arrangement has particular utility in that the bale wagon 12 provides the motive force for the baler 11 and permits operation of the baler 11 and the bale wagon 12 by one operator. The power for operating the baler 11 is provided by an engine 13 mounted thereon. It should be emphasized however that the principles of the present invention are equally applicable to combinations of other types of balers and bale wagons, e.g. a self-propelled or towed baler and a towed bale wagon.

As best seen in FIGURE 2 the conventional baler 11 includes a longitudinally extending bale chamber 14 having upright side walls 16 and 17. Upper and lower channels 18 and 19 provide bale tension means common to such balers.

The transfer mechanism 10 comprises generally a bale guide frame 21 disposed rearwardly of the bale chamber 14, a bale carrier 22 pivotally mounted on baler 11, a deflector frame 23 mounted above the baler and a hydraulic power control system for effecting the desired sequence of operations.

The guide frame 21 includes two longitudinally extending upright wall extensions 26 and 27. The wall extensions 26 and 27 are bolted to side walls 16 and 17, respectively, and extend rearwardly therefrom. A horizontal plate 28 interconnects bottom portions of each of the wall extensions 26 and 27. Mounted on the horizontal plate and in the line of bale movement is an inclined plate 29. A leaf spring 31 bolted to channel 18 extends rearwardly therefrom terminating at a point above and rearward of inclined plate 29. The leaf spring 31 has a horizontal forward section 31a, a downturned section 31b, and a rounded section 31c. The rounded section 31c is adapted to engage the top of a bale moving along the inclined plate 29.

Now referring to FIGURES 3, 4 and 5, the bale carrier 22 is pivotally mounted to baler 11 it a point below the bale chamber 14 by means of a U-shaped frame 32. The U-shaped frame 32 includes laterally spaced legs 33 and 34 interconnected at their rearwardly disposed ends by a cross member 35 and at their forward ends by a shaft 36 which extends through lateral mounting plates 37 and 38. The mounting plates 37 and 38 are respectively bolted to upright walls 16 and 17 and are each provided with an elongated slot 39. Slots 39, 39 are aligned to receive shaft 36 and to permit same to move longitudinally with respect to bale chamber 14. The elongated slots 39, 39 not only provide a front support for frame 32 but serve as a pivot point to be discussed in more detail later. Flanges 46 and 47 mounted on shaft 36 flank the mounting plates 37 and 38 thereby preventing lateral movement of frame 32. Thus it is seen that frame 32 is hinged to the baler 11 by means of the shaft 36 extending through elongated slots 39, 39.

The frame 32 is pivotable about the hinge point between a horizontal home position (solid line position of FIGURES 3 and 5) and a vertical position (broken line position of FIGURES 3 and 5). In order to effect the pivotal movement, shaft 36 has an offset section to which is attached a bracket 48. The bracket 48 provides a means for connecting a power source to the frame 32. Rearward movement of bracket 48 first causes the shaft to move rectilinearly along elongated slots 39, 39 and then pivotally about shaft 36.

Attached to the cross member 35 and disposed rearwardly thereof is an extension frame 49. The extension frame 49 supports the bale gripping means which includes a bale receiving platform 51 flanked by an upright stationary wall 52 and a movable wall 53. The movable wall 53 is hinged to extension frame 49 by means by pin 54 and is pivotable between a horizontal position and a vertical position. The platform 51 is at the same vertical elevation as plate 28 and the stationary wall 52 and movable wall 53, in the vertical position, are in general longitudinal alignment with wall extensions 26 and 27, respectively. The stationary wall 52 has an outwardly flared section 56 and a flat section 57 backed up by brace 55 to provide for additional rigidity. Movable wall 53 is substantially flat and when in the vertical position is aligned in spaced relation with the flat section 57 of stationary wall 52.

A hydraulic clamping cylinder 58 carried by extension frame 49 and disposed under platform 51, provides a means for moving the movable wall 53 between a horizontal and a vertical position. The hydraulic cylinder 58 includes a telescoping piston rod 59 attached to an arm 60 formed in movable wall 53. Referring now to FIGURE 4 it will be seen that movement of the piston rod 59 pivots the wall about the pin 54. The flat section 57 of stationary wall 52 and movable wall 53 are provided with inwardly protruding and rearwardly opened flutes 68 which aid in the gripping ability of the walls 52 and 53.

In the horizontal home position as shown in FIGURE 2 the bale carrier frame 32 rests on crossbar 61 which is attached to lower edges of wall extensions 26 and 27. A stop 41 attached to plate 37 and extending outwardly therefrom serves to limit the pivotal movement of the bale carrier frame 32.

The deflector frame 23 consists of four upright, parallel bars 61, 62, 63 and 64 which prescribe a bale receiving chamber denoted as 65. Upright bars 61 and 63 are bolted to wall 16 and upright bars 62 and 64 are bolted to wall 17. As shown in FIGURE 2 the forwardly facing side of the receiving chamber 65 is closed by a pair of horizontal bars 66, and the side extending up from wall 16 is closed by horizontal bar 67. The rearwardly facing side of the receiving chamber 65 is open to permit the passage of a bale therethrough, and the side defined by upright bars 62 and 64 is open to permit the discharge of bales therethrough. The rearwardly facing opening, defined by upright bars 63 and 64, and the pivotal axis of the bale carrier 22 as defined by elongated slots 39, 39, lie in the same plane so that a bale carried by the bale carrier 22 is deposited upright in the receiving chamber 65.

A bracket 70 disposed in the receiving chamber 65 extends inwardly from the side defined by bars 61 and 63. Attached to upright bars 61 and 63 and extending across bracket 70 is a sheet metal section 72. The sheet metal section has an upright wall 72a, a horizontal platform 72b, and a downturned section 72c. This particular configuration in conjunction with leaf spring 73 protruding into the receiving chamber 65 causes a bale released by the bale carrier 22 to flop over on its side as it is deposited on the receiving platform of the bale wagon 12.

Leaf spring 74 is provided to prevent the lower end of a bale from rebounding out of receiving chamber 65, when it is released by bale carrier 22.

The various components of the present invention are actuated by means of a hydraulic system (schematically illustrated in FIGURE 6) which includes two sequencing valves 80a, 80b, a three position detented four-way directional control valve 81, a lift cylinder 82, and the clamping cylinder 58. The components of the hydraulic system are interconnected by hydraulic lines designated as 84.

As best seen in FIGURE 5, a trip lever 85 is positioned immediately after the inclined plate 29 in the direction of bale movement and pivotally connected to plate 28 as at 86. The valve 81 attached to the underside of plate 28 has a rearwardly extending spool 88 which is actuated by the trip lever through the bellcrank configuration of the trip lever 85. The trip lever 85 is provided with an elongated vertically extending slot 90 which receives a lug 92 projecting from spool 88.

The lift cylinder 82 is disposed longitudinally below the bale chamber and extension plate 28, and has a rearwardly extending end 89 hinged to crossbar 61 as at 93 and a forward piston rod 94 connected to bracket 48. In the horizontal home position of the bale carrier 22, the lift cylinder 82 is in the extended position, the piston rod 94 and bracket 48 occupying the solid line position of FIGURE 5. Retraction of piston rod 94 into cylinder 82 moves the bracket 48 to the dotted line position of FIGURE 5, which pivots shaft 36, upending bale carrier 22.

A push rod 95 extending generally parallel to the cylinder 82 provides means for actuating the valve 81 in response to movement of the bale carrier 22. The push rod 95 has its forward end slidably supported by a movable collar 97 which in turn is supported by bracket 48. The forward extremity of push rod 95 is provided with a cap 98 which is adapted to be moved by forward movement of collar 97. Longitudinally spaced along the push rod 95 and on the rearward side of the movable collar 97, is a clamp collar 100 which is adapted to be moved by forward movement of collar 97. Coil springs 99 and 101 concentrically mounted on push rod 95 compress against movable collar 97 upon cap 98 and clamp collar 100 due to detent resistance of spool 88. Once sufficient force is exerted to move spool 88 from one of its detented positions, the coil springs 99 or 101 return to their free position forcing spool 88 to its next position. The rearward extremity of the push rod 95 is hinged to a downward extension 96 of trip lever 85 so that movement of the push rod 95 is translated to spool 88 through pivotal movement of the extension 96 about hinge connection 86.

Since the present invention does not involve the particular adaptation of the spool valve 81 and sequencing valves 80a, 80b to the contemplated structure, description of these parts has been in general terms.

*Operation*

The baler 11 and the bale wagon 12 are driven along as a unit in registry with windrows of hay. The hay is picked up by the baler 11 and discharged from the bale chamber 14 in the form of elongated bales B. The bale B upon being discharged from the bale chamber 14 is forced through the guide frame 21 onto the inclined plate 29. The inclined plate 29 prevents the bale B from actuating trip lever 85 and valve 81 until the bale is received upon the platform 51. The front of the bale (with reference to the direction of bale movement) reaches the receiving platform 51 and is disposed between the movable and nonmovable walls 52 and 53 before the rear of the bale B clears the inclined platform 29 (see FIGURE 2).

Upon clearing the inclined platform 29, the bale B engages the trip lever 85, with assisting downward force of flat spring 31, actuating the valve 81. The valve 81 directs hydraulic flow to clamping cylinder 58 causing push rod 59 to extend. This forces the movable wall 53 from a horizontal to a vertical position securely clamping the bale B between the stationary and movable walls 52 and 53. When a pre-determined force has been exerted to clamp the bale B securely between the movable and stationary walls 52 and 53, the hydraulic flow is diverted by means of the sequencing valve 80a to the lift cylinder 82 (see FIGURE 6). Flow to the lift cylinder 82 retracts the piston rod 94 causing the bale carrier 22 to move rectilinearly rearwardly in slots 39, 39, and then pivotally from the horizontal to the vertical position, upending and depositing the bale B in the bale receiving chamber 65.

As the piston rod 94 is retracted into the cylinder 82, the movable collar 97 mounted on the brackets 48 slides along the push rod 95 and near the end of the retracted stroke and through coil spring 101 (broken line position of FIGURE 5) forces the collar 100 and push rod 95 rearwardly. The rearward movement of the push rod 95 through lever extension 96 shifts the valve 81 to the reverse position. With the valve in this position, hydraulic flow is diverted to the clamping cylinder 58 causing piston rod 59 to retract, thereby releasing the bale B.

When piston rod 59 is retracted to its extreme position, sequence valve 80b diverts flow to cylinder 82. This reverses the direction of movement of the piston rod 94 and returns the bale carrier 22 to its horizontal home position. Near the end of the telescopic movement of the piston rod 94 from the cylinder 82, movable collar 97 engages the coil spring 99 forcing the cap 98 and the push rod 95 to move forwardly. Forward movement of the push rod 95 translated through extension 96 returns the spool valve 81 to the neutral position, placing the transfer mechanism in a condition for receiving a succeeding bale.

The upended bale upon being released by the gripping walls 52 and 53, falls upon the platform 72b. The platform 72b aided by leaf spring 73 causes the bale to flop on its side as it is deposited upon the receiving platform of the bale wagon 12.

Thus it has been demonstrated that the transfer mechanism receiving a bale having its longitudinal axis parallel to the direction of bale movement, elevates and rearrange the bale wherein the longitudinal axis is transverse to the original direction of bale movement.

It should be understood, of course, that the foregoing disclosure relates to only a preferred embodiment of the invention and that numerous modifications and variations may be made therein without departing from the spirit and scope of the invention.

What is claimed is:

1. A transfer mechanism for elevating and depositing bales received from a baler of the type having a longitudinally extending bale chamber to an associated bale wagon haing a platform elevated above said bale chamber, said transfer mechanism comprising: a frame attached to said bale chamber; a bale carrier supported by said frame and disposed in line with said bale chamber for receiving bales discharged therefrom, said bale carrier sequentially movable horizontally and pivotally with respect to said bale chamber to move bales received on said bale carrier first away from said bale chamber and second to an elevated position adjacent to said bale wagon, the pivotal movement of said bale carrier being approximately 90°; and means for moving bales from said bale carrier onto said wagon when said bale carrier occupies said elevated position.

2. The transfer mechanism according to claim 1 wherein the said pivotal movement of said bale carrier is about a horizontal axis transverse with said bale chamber.

3. The transfer mechanism according to claim 2 wherein the pivotal movement is toward said bale chamber.

4. The transfer mechanism according to claim 1 wherein the bale carrier includes clamping means for gripping bales received thereon in a fixed disposition whereby said bale carrier and bales received thereon move as a unit.

5. The transfer mechanism according to claim 4 wherein the clamping means includes a stationary wall and a movable wall, said movable wall being normally in a disengaged position, said movable wall being movable to an engaged position wherein said movable wall is parallel to and displaced slightly less than one bale width from said stationary wall, means for moving said movable wall to the engaged position whereby bales are gripped on opposite sides by said stationary and movable walls.

6. The transfer mechanism according to claim 5 and further characterized by means responsive to receipt of bales on said bale carrier for moving said movable wall to said engaged position and means responsive to the elevated position of said bale carrier for moving said movable wall to said disengaged position.

7. The transfer mechanism according to claim 6 and further characterized as having sensing means associated with said bale carrier for detecting the presence of a bale thereon, means responsive to said sensing means for moving said movable wall to said engaged position, said last mentioned means also responsive to the elevated position of said bale carrier for moving said movable wall to said disengaged position.

8. A transfer mechanism for transferring elongated bales from a baler onto an elevated and associated wagon bed, said transfer mechanism comprising: a bale carrier attached to said baler for receiving bales discharged therefrom, the longitudinal axis of said bale being in the direction of bale movement from said baler, said bale carrier including means for gripping bales received thereon so that said carrier and said gripped bales move as a unit; means operative upon said bale carrier for upending and elevating said bales to a level above said wagon bed; means for releasing the grip of said gripping means on said bales when in the upended position; deflector means spaced below the upended bale for causing the bale to topple onto said wagon bed upon being released by said gripping means.

9. A transfer mechanism for elevating and depositing a bale of hay received from the discharge of a rearwardly extending bale chamber of a baler to an associated and elevated receiving bed, said transfer mechanism comprising: a frame attached to said baler; a bale carrier supported on said frame and disposed in line with said bale chamber discharge for receiving bales thereon; sensing means associated with said bale carrier for detecting the presence of bales thereon, said bale carrier including means for gripping a bale thereto so that said bale carrier and said gripped bale are movable as a unit, said gripping means being operatively responsive to said sensing means; means for moving said bale carrier to a rearwardly displaced position, means for forwardly and upwardly pivoting said bale carrier from said rearwardly displaced position to an elevated position opposite said receiving bed; means for releasing said gripping means, said last mentioned means operatively responsive to the elevated position of said bale carrier; deflector means operative upon a bale released by said gripping means for guiding the bale onto said receiving bed.

10. A transfer mechanism for elevating and transferring bales received from a bale chamber of a baler onto an associated wagon, said transfer mechanism comprising a frame attached to said baler; a bale carrier supported by said frame and disposed adjacent said baler for receiving bales discharged therefrom, said bale carrier being movable to carry bales received thereon away from said baler and to an elevated position adjacent said bale wagon, said bale carrier being sequentially movable first horizontally away from said baler and second to said elevated position, the second sequential movement of said bale carrier being pivotable about a horizontal axis; and means for moving bales from said bale carrier onto said wagon when said bale carrier is in said elevated position.

11. The transfer mechanism according to claim 10 wherein the horizontal pivotal axis is transverse to said bale chamber.

12. A transfer mechanism for elevating and transferring bales received from a bale chamber of a baler onto an associated wagon, said transfer mechanism comprising a frame attached to said baler; a bale carrier movably supported by said frame and disposed adjacent said baler for receiving bales discharged therefrom; means mounting said carrier for movement horizontally on said frame away from said baler; means mounting said carrier for pivoting movement upwardly to an elevated position adjacent said bale wagon; and means for moving bales from said bale carrier onto said wagon when said bale carrier is in said elevated position.

13. The subject matter of claim 12, including sensing means operative in response to the presence of a bale on said carrier for pivoting said carrier to said elevated position.

References Cited

UNITED STATES PATENTS

| | | |
|---|---|---|
| 2,909,264 | 10/1959 | Kneib. |
| 3,126,083 | 3/1964 | Hollyday. |
| 3,275,117 | 9/1966 | Weigel _____ 214—42 XR |

ROBERT G. SHERIDAN, *Primary Examiner.*

U.S. Cl. X.R.

100—188; 214—147, 148